Jan. 4, 1955
L. C. HUDDLESTON ET AL
2,698,635
CONTROL MECHANISM FOR POWER SAWS
Filed Sept. 28, 1953
2 Sheets-Sheet 1
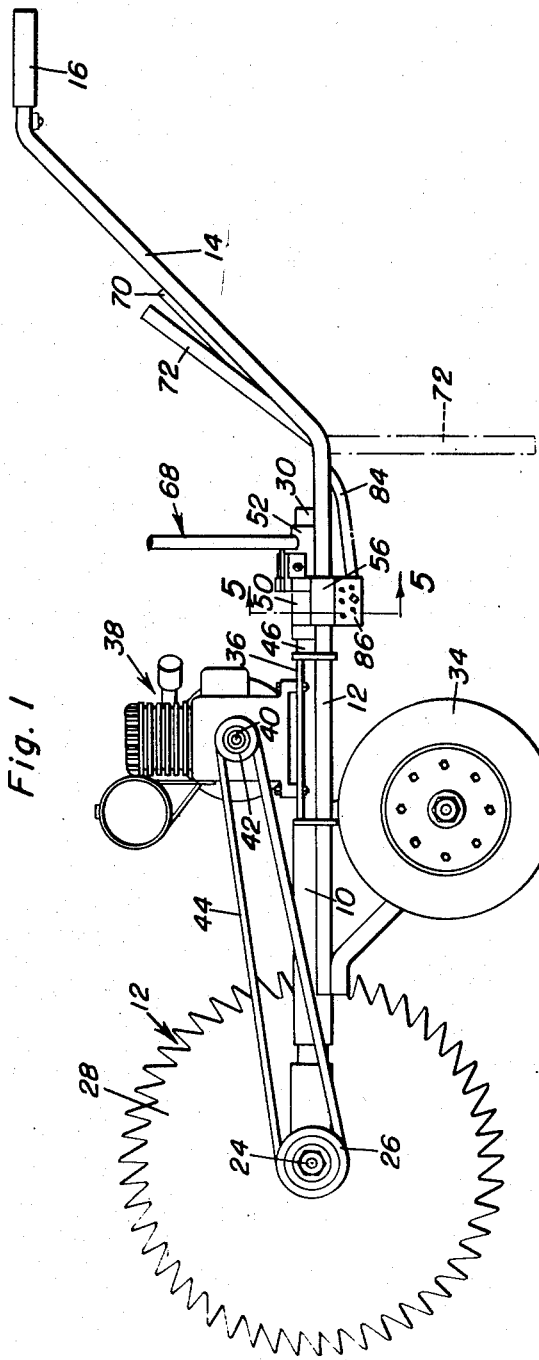
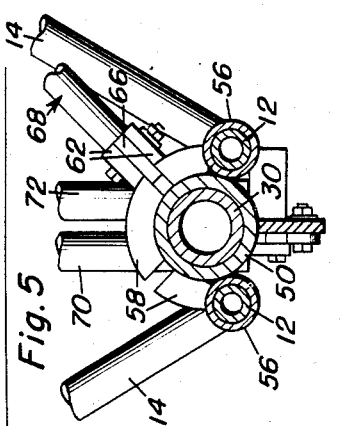
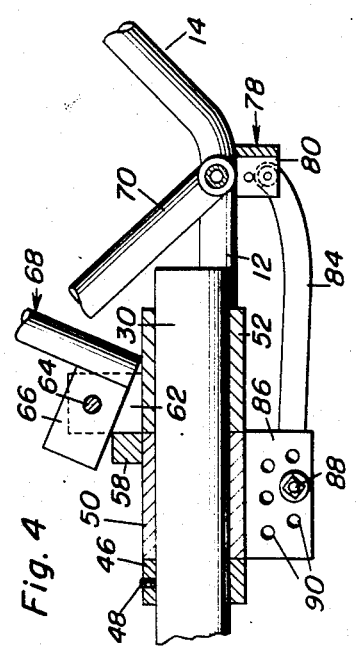
Loyd C. Huddleston
Frank B. White
Thomas F. Eastes
INVENTORS

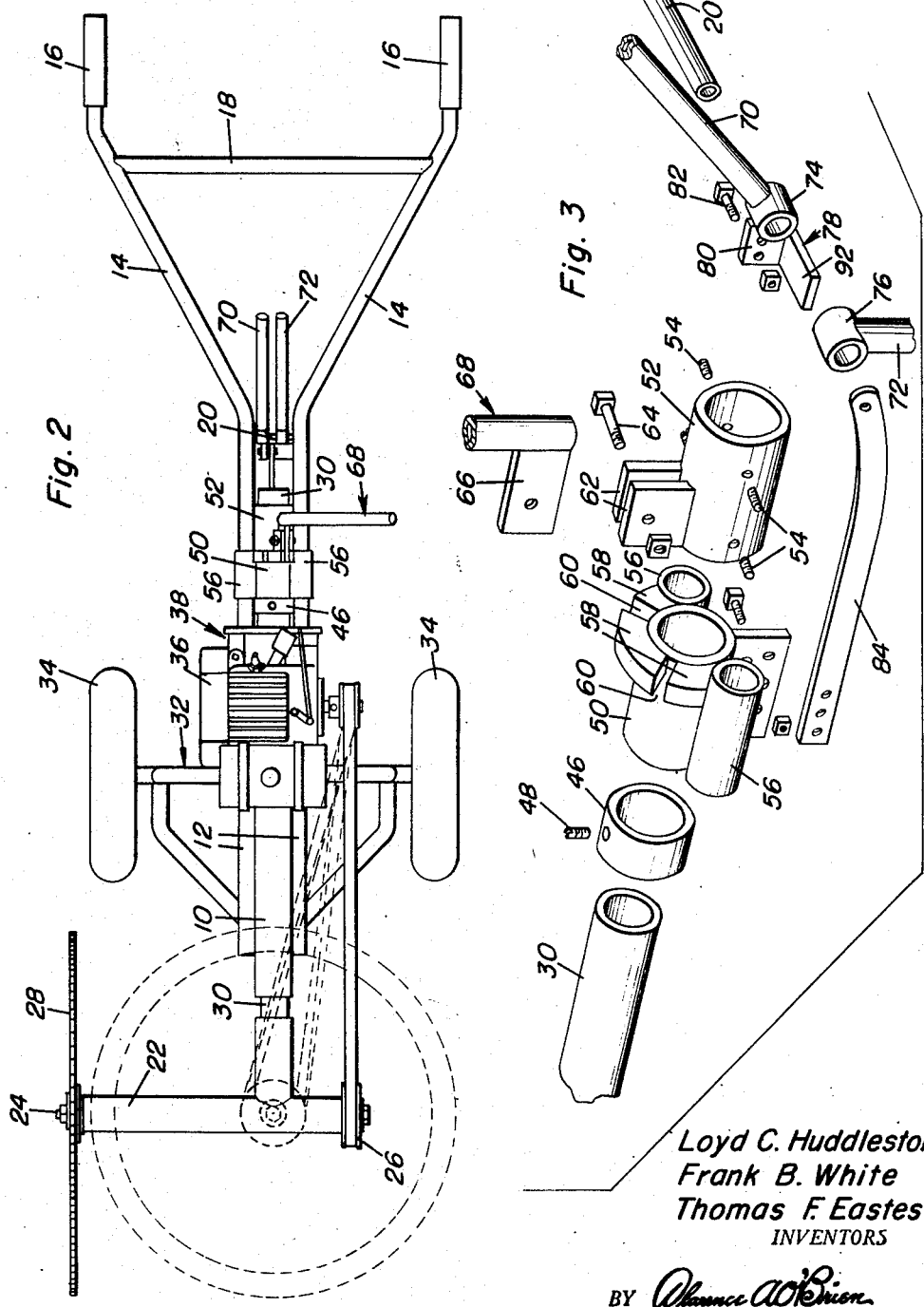

United States Patent Office 2,698,635
Patented Jan. 4, 1955

2,698,635

CONTROL MECHANISM FOR POWER SAWS

Loyd C. Huddleston, Frank B. White, and Thomas F. Eastes, Lebanon, Tenn., assignors to E. & W. Manufacturing Company, Lebanon, Tenn., a copartnership Application September 28, 1953, Serial No. 382,631

6 Claims. (Cl. 143—43)

This invention relates generally to mobile power saws and pertains more particularly to an improved form thereof.

A primary object of this invention is to provide an improved construction of mobile saws in which the mounting of the saw blade and the control mechanism for imparting drive thereto and for adjusting the angular disposition of the saw blade is of greatly simplified yet fully effective construction and which incorporates mechanism for quickly adjusting the angular disposition of the saw blade and for rapidly declutching or interrupting the power drive to the saw blade.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a side elevational view of the saw constructed in accordance with this invention;

Figure 2 is a top plan view of the assembly shown in Figure 1;

Figure 3 is an exploded perspective of the control mechanism;

Figure 4 (sheet 1) is a longitudinal section taken through a portion of the control mechanism; and Figure 5 is a transverse vertical section taken substantially along the plane of section line 5—5 in Figure 1 showing further details of the control mechanism.

Referring now more particularly to the drawings, reference numeral 10 indicates an elongated tubular member which forms the main supporting structure for the saw assembly which is indicated generally by the reference character 12. Rigidly secured at opposite sides of this tubular member are the side rail members 12 and it will be noted that these side rails extend rearwardly from the tubular member and that their rearward portions 14 are inclined upwardly to terminate in horizontal hand grip portions 16 in the manner shown. The portions 14 are also divergent and may be provided with a cross brace member 18 for rigidifying the handle structure and the side rails are further reenforced and rigidified by a pivot shaft 20 extending therebetween adjacent the point at which the portions 14 are inclined upwardly from the main body portion of the side rails.

The saw assembly includes a tubular support arm member 22 within which a shaft 24 is journaled and is provided at opposite ends thereof with the pulley member 26 and the circular saw blade 28 respectively. Rigidly secured to this support arm 22 is a mounting arm 30 which is rotatably and slidably received in the tubular frame member 10 and which extends rearwardly therefrom to a point adjacent the side rail portions 14.

The undercarriage structure for the assembly is indicated generally by the reference character 32 and may take any convenient form rigidly secured to the frame members 10 and 12 and which includes stub axle portions journaling the wheel assemblies 34 thereon such that the mechanism may be easily manipulated over the ground surface. A motor platform 36 is suitably secured to the frame members 10 and 12 and this platform provides a support to which the power source indicated generally by the reference character 38 is rigidly secured. The power source includes a drive shaft 40 having a pulley 42 thereon and a belt 44 trained over the pulley 40 as well as the pulley 26 to impart drive to the saw blades 28, as will be manifest. The power source is, of course, provided with suitable control mechanism which may include throttle control means associated with the handle assembly of the frame for ease of manipulation by an operator.

Referring now more particularly to Figures 3, 4 and 5, it will be seen that the extreme rearward portion of the mounting arm 30 is provided with a stop collar 46 rigidly affixed thereto as by a set screw 48 and that a control collar 50 is journaled on the mounting arm such that the mounting arm is freely rotatable with respect thereto. A second collar control member 52 is rigidly affixed to the mounting arm 30 as by set screws 54 and this collar taken in conjunction with the collar 46 properly positions the collar 50 therebetween. The collar 50 is provided with a pair of sleeves 56 disposed at opposite sides thereof which are disposed in concentric relation on the respective side rails 12 such that the collar 50 may not rotate with respect to the frame. The collar 50 is additionally provided with radial ear members 58 which are disposed in circumferentially spaced relation such as to provide slots 60 therebetween for a purpose presently apparent. The collar 52 is provided at its end adjacent the collar 50 with a pair of parallel bracket ears 62 which are disposed in spaced relation and which are apertured to receive the pivot bolt assembly 64 such as to pivotally receive the locking ear 66 therebetween, this latter ear being a portion of the shifter assembly indicated generally by the reference character 68.

The previously described pivot shaft 20 extending between the side rails 12 rotatably receives a pair of lever members 70 and 72 which are journaled thereon through the medium of their boss portions 74 and 76 respectively and the lever 70 has a depending bracket member 78 rigidly affixed thereto in the manner shown most clearly in Figure 4 and this bracket includes a leg portion 80 having a pair of spaced apertures therein for selectively receiving a pivotal member 82 for connection to the control link member 84 in the manner shown. The opposite end of this link 84 is pivotally secured to a depending bracket ear 86 on the collar 50 as by a pivot bolt 88 selectively receivable in one of the various apertures 90 therein. The other of the levers 72 constitutes a supporting leg for the saw assembly as indicated most clearly in dotted lines in Figure 1. The other ear 92 of the bracket 78 is adapted to underlie one of the frame side rails 12 and limit rearward pivotal movement of the associated lever 70.

It will be manifest that forward pivotal movement of the control lever 70 will effect rearward shifting of the mounting arm 30 with respect to the frame members 10 and 12 such that the effective distance between the pulleys 26 and 40 will be lessened to interrupt the drive therebetween by slackening of the belt 44. When it is desired to manipulate the saw blade 28 from the full to the dotted line position shown in Figure 2, it is merely necessary to pull rearwardly on the control lever assembly 68 and disengage the latching or locking ear 66 from one associated slot 60 and rotate the lever 68 to a position such that the lever may be pushed forwardly again to engage the ear 66 in the other of the slots 60. In this manner, it will be evident that the power to the saw blade 28 may be interrupted in a very rapid and efficient manner and that the angular disposition of the saw blade with respect to the material being cut may be varied rapidly also.

It will also be evident that the particular control mechanism above described taken in conjunction with the specific frame construction operates to produce a very efficient and effective control for the improved saw assembly and that the saw assembly may be maintained at a minimum of weight by the relatively simple and effective construction shown.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A mobile power saw comprising a wheeled frame, said frame including a longitudinally extending tubular member and a pair of side rail members secured at opposite sides of said tubular member and in spaced relation thereto, said side rails extending rearwardly beyond said tubular member and being inclined upwardly therefrom to present handles, a saw assembly including a support arm rotatably carrying a circular saw and a mounting arm slidably received in said tubular frame member, a power source on said frame, means connecting said saw and said power source for driving the former, means for shifting said mounting arm longitudinally with respect to said tubular member for selectively establishing and disestablishing drive to said saw, said means including a collar secured to a rearward portion of said mounting arm extending beyond said tubular member, and a pair of sleeves secured at opposite sides of said collar and embracing said side rails for longitudinal movement therealong.

2. A mobile power saw comprising a wheeled frame, said frame including a longitudinally extending tubular member and a pair of side rail members secured at opposite sides of said tubular member and in spaced relation thereto, said side rails extending rearwardly beyond said tubular member and being inclined upwardly therefrom to present handles, a saw assembly including a support arm rotatably carrying a circular saw and a mounting arm slidably and rotatably received in said tubular frame member, a power source on said frame, means connecting said saw and said power source for driving the former, means for shifting said mounting arm longitudinally with respect to said tubular member for selectively establishing and disestablishing drive to said saw, said means including a collar secured to a rearward portion of said mounting arm extending beyond said tubular member, said collar being journaled on said tubular member and fixed longitudinally thereof, and a pair of sleeves secured at opposite sides of said collar and embracing said side rails for longitudinal movement therealong.

3. A mobile power saw comprising a wheeled frame, said frame including a longitudinally extending tubular member and a pair of side rail members secured to opposite sides of said tubular member and in spaced relation thereto, said side rails extending rearwardly beyond said tubular member and being inclined upwardly therefrom to present handles, a saw assembly including a support arm rotatably carrying a circular saw and a mounting arm slidably and rotatably received in said tubular frame member, a power source on said frame, means connecting said saw and said power source for driving the former, means for shifting said mounting arm longitudinally with respect to said tubular member for selectively establishing and disestablishing drive to said saw, and means for selectively locking said mounting arm in various rotated positions with respect to said tubular member for varying the angular disposition of said saw, said first-mentioned means including a collar secured to a rearward portion of said mounting arm extending beyond said tubular member, and a pair of sleeves secured at opposite sides of said collar and embracing said side rails for longitudinal movement therealong, said last mentioned means including a second collar fixed to said mounting arm adjacent the first collar, and means for selectively locking the second collar in various rotated angular positions with respect to the first collar.

4. A mobile power saw comprising a wheeled frame, said frame including a longitudinally extending tubular member and a pair of side rail members secured at opposite sides of said tubular member and in spaced relation thereto, a saw assembly including a support arm rotatably carrying a circular saw and a mounting arm slidably connected with said tubular frame member, a power source on said frame, means connecting said saw and said power source for driving the former, means for shifting said mounting arm longitudinally with respect to said tubular member for selectively establishing and disestablishing drive to said saw, said means including a collar secured to a rearward portion of said mounting arm extending beyond said tubular member, and a pair of sleeves secured at opposite sides of said collar and embracing said side rails for longitudinal movement therealong.

5. A mobile power saw comprising a wheeled frame, said frame including a longitudinally extending tubular member and a pair of side rail members secured at opposite sides of said tubular member and in spaced relation thereto, a saw assembly including a support arm rotatably carrying a circular saw and a mounting arm slidably and rotatably connected with said tubular frame member, a power source on said frame, means connecting said saw and said power source for driving the former, means for shifting said mounting arm longitudinally with respect to said tubular member for selectively establishing and disestablishing drive to said saw, said means including a collar secured to a rearward portion of said mounting arm extending beyond said tubular member, said collar being journaled on said tubular member and fixed longitudinally thereof, and a pair of sleeves secured at opposite sides of said collar and embracing said side rails for longitudinal movement therealong.

6. A mobile power saw comprising a wheeled frame, said frame including a longitudinally extending tubular member and a pair of side rail members secured to opposite sides of said tubular member and in spaced relation thereto, a saw assembly including a support arm rotatably carrying a circular saw and a mounting arm slidably and rotatably connected with said tubular frame member, a power source on said frame, means connecting said saw and said power source for driving the former, means for shifting said mounting arm longitudinally with respect to said tubular member for selectively establishing and disestablishing drive to said saw, and means for selectively locking said mounting arm in various rotated positions with respect to said tubular member for varying the angular disposition of said saw, said first-mentioned means including a collar secured to a rearward portion of said mounting arm extending beyond said tubular member, and a pair of sleeves secured at opposite sides of said collar and embracing said side rails for longitudinal movement therealong, said last mentioned means including a second collar fixed to said mounting arm adjacent the first collar, and means for selectively locking the second collar in various rotated angular positions with respect to the first collar.

References Cited in the file of this patent

UNITED STATES PATENTS

| 2,407,028 | McLean | Sept. 3, 1946 |
| 2,461,188 | Stoner | Feb. 8, 1949 |
| 2,640,512 | Pomeroy | June 2, 1953 |

FOREIGN PATENTS

| 118,961 | Australia | Sept. 12, 1944 |
| 139,339 | Australia | Nov. 9, 1950 |